UNITED STATES PATENT OFFICE.

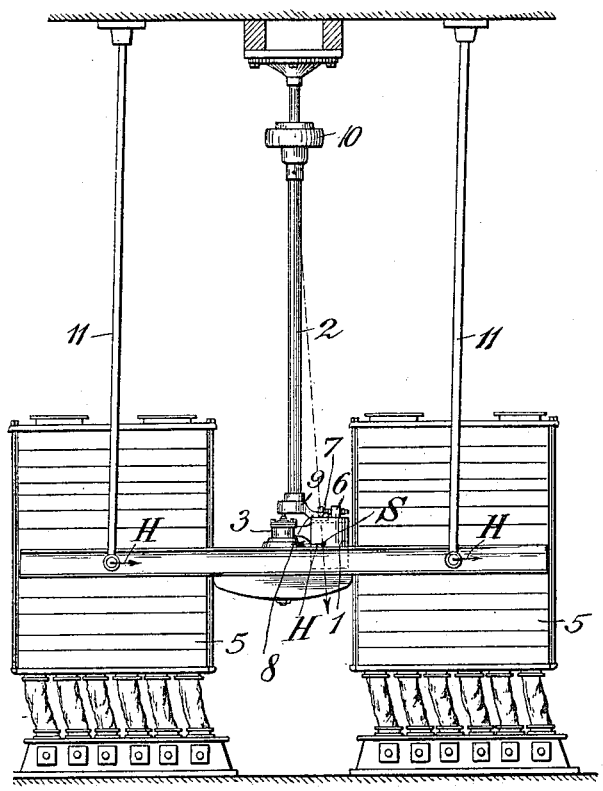
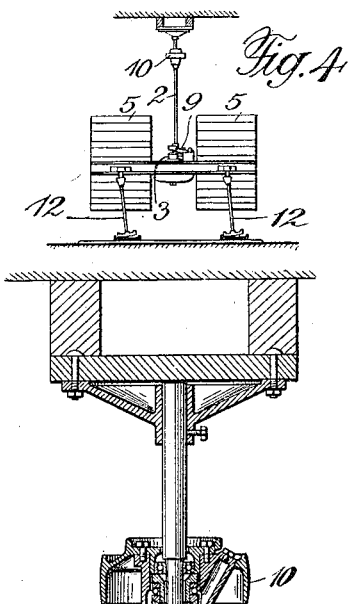
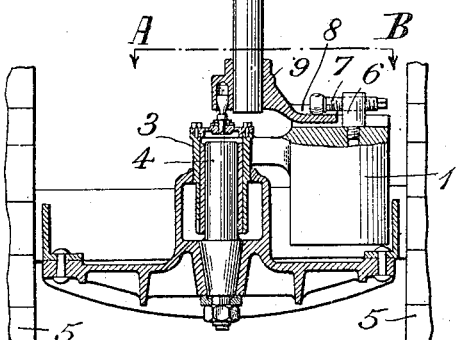

ERNST ROTH, OF NIEDERUTZWIL, SWITZERLAND, ASSIGNOR TO THE FIRM OF GEBRÜDER BÜHLER, OF UZWIL, SWITZERLAND.

PLANSIFTER.

1,210,989.                 Specification of Letters Patent.        Patented Jan. 2, 1917.

Application filed April 22, 1916. Serial No. 92,969.

*To all whom it may concern:*

Be it known that I, ERNST ROTH, a citizen of the Republic of Switzerland, residing at Niederutzwil, Canton of St. Gall, Switzerland, have invented certain new and useful Improvements in Plansifters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has reference to a so-called freely oscillating plansifter in which, in a known manner, the sieve box and the balancing weight thereof causing the rotary movement, are each suspended separately, or in which the sieve box is supported in an appropriate manner and only the balancing weight is suspended swinging, and in which furthermore, in a known manner, the position of the balancing weight does not change appreciably in relation to the center of gravity of sieve box either when the sifter is at rest or when it is at work.

In plansifters of the type stated it has been already proposed to rigidly connect a straight, suspended swinging shaft with the balancing weight and to so locate the driving gudgeon rigidly connected to the driving shaft, that the said gudgeon, in the inoperative and in the operative position with a normal amplitude or deflection of the plansifter, retains a vertical position in order to prevent the main bearing of the pendulum shaft having to be turned to an amount corresponding to the angle of deflection at each revolution. This arrangement has the drawback, however, that with a greater or smaller amplitude of the sieve box movement, which often occurs and which also may be desired, the main bearing of the pendulum shaft had to turn angularly a certain amount, a circumstance which is very prejudicial especially as the main bearing in itself is a highly stressed bearing. Furthermore in the known arrangement under notice a horizontal power component is produced which brings the sieve box into an inclined position which approximately corresponds to the working position. When, however, the installation of the plansifter necessitates that the lengths of the suspension devices of the sieve box and of the balancing weight be made different by adjustment of the swinging suspension shaft, then the horizontal power components, produced by the weight of the sieve box and the balancing weight, no longer coincide. This circumstance causes unpleasant interruptions of the smooth running of the apparatus more especially upon the starting and stopping thereof.

The above mentioned disadvantages which are inherent in the hitherto known plansifters of the type hereinbefore referred to, are avoided by constructing the plansifter or, properly speaking the driving gear thereof, as shown by way of example in the accompanying illustrative drawing, in which:

Figure 1 is a front view of an embodiment of the invention, Fig. 2 is a detail of a part of the plansifter illustrated in Fig. 1, showing some parts in vertical section, Fig. 3 is a section on the line A—B of Fig. 2, and Fig. 4 is a front view of a second embodiment of the invention.

According to the construction shown in Figs. 1–3 the balancing weight 1 is not fixed to the pendulum shaft 2 but is articulated thereto. To this end the balancing weight 1 connected to a sleeve 3, which acts as a bearing for a gudgeon 4 adapted to transmit an oscillating movement to the sieve boxes 5, carries a pin 6. The boxes 5 are suspended swinging by means of rods 11. In the pin 6 is mounted an adjustable, screw-threaded bolt 7, the head of which lies in a notch 8 of an arm 9 fixed to the pendulum shaft 2. 10 denotes a pulley operatively connected to the shaft 2 and adapted to transmit to the latter a rotary movement. The bolt 7 and the arm 9 form an articulated connection between the balancing weight 1 and the pendulum shaft 2. The point of articulation lies therefore in the horizontal direction from gudgeon 4 to the center of gravity S of the balancing weight 1 outside the neutral axis of the whole system (Fig. 1). The neutral axis is the geometrical axis about which the whole system oscillates. This point of articulation can be moved either away from or toward the neutral axis by accordingly adjusting bolt 7. This construction possesses the advantage that during each amplitude or throw of the sieve box the drive gudgeon 4 of the main bearing remains in a vertical position. By a greater lift of the sieve box 5 only the counter weight 1 is slightly raised while, by a smaller lift the said counter weight is lowered a little. Moreover the weight 1 cannot exert any detrimental turning movement upon the gudgeon 4, such a movement being smaller the nearer the weight 1 is suspended to the vertical gravity-axis. By movement of the point of suspension to the left or to the right it is possible, in order to obtain a quiet starting and speeding up, to increase or diminish the horizontally acting force H (Fig. 1) which sets the suspended sieve box in the inclined working position.

As shown in Fig. 4 the invention can also be applied to a plansifter having sieve boxes fixed to supports 12.

I claim:

1. In a freely oscillating plan-sifter in combination, a sieve box, a pendulum member, a balancing weight in operative connection with said member and box, the point of connection of said weight and member being outside of the neutral axis and to one side of the center of gravity of said weight.

2. In a freely oscillating plansifter, in combination, a sieve box, a balancing weight operatively connected to said box, a pendulum means carrying said balancing weight and an articulated connection between said pendulum means and the balancing weight and lying outside the neutral axis on the side of the center of gravity of the balancing weight.

3. In a freely oscillating plan-sifter in combination, a sieve box, means to swingingly support said box, a pendulum shaft, means to rotate said shaft, a balancing weight supported by said shaft and operatively connected to said box, said weight retaining when in and out of operation essentially its position in relation to the center of gravity of said box, the point of support of said weight lying in or approximately in a vertical axis through the center of gravity of said weight.

4. In a freely oscillating plansifter, in combination, a sieve box, a balancing weight operatively connected to said box and retaining essentially in and out of operation its position in relation to the center of gravity of the sieve box, oscillating suspending means for the sieve box, a pendulum shaft for the balancing weight, means to rotate this shaft, and an articulated connection between the balancing weight and said shaft, this connection lying in or approximately in the vertical axis of the center of gravity of the balancing weight.

5. In a freely oscillating plansifter, in combination, a sieve box, a balancing weight operatively connected to said box and retaining essentially in and out of operation its position in relation to the center of gravity of the sieve box, oscillating suspending means for the sieve box, a pendulum shaft for the balancing weight, means to rotate this shaft, an articulated connection between the balancing weight and said shaft, said connection lying approximately in a vertical axis through the center of gravity of said weight, and means to adjust the point at which the balancing weight is connected with the pendulum shaft, so that the horizontal power components can be increased or diminished.

In testimony that I claim the foregoing as my invention, I have signed my name in presence of two subscribing witnesses.

ERNST ROTH.

Witnesses:
 JOH. KNOBEL,
 CARL GUBLER.

Copies of this patent may be obtained for five cents each, by addressing the "Commissioner of Patents, Washington, D. C."